July 25, 1939.  M. A. MORRISSEY ET AL  2,167,156
METHOD OF PREPARING CONCRETE
Filed Feb. 26, 1935
FIG_1_
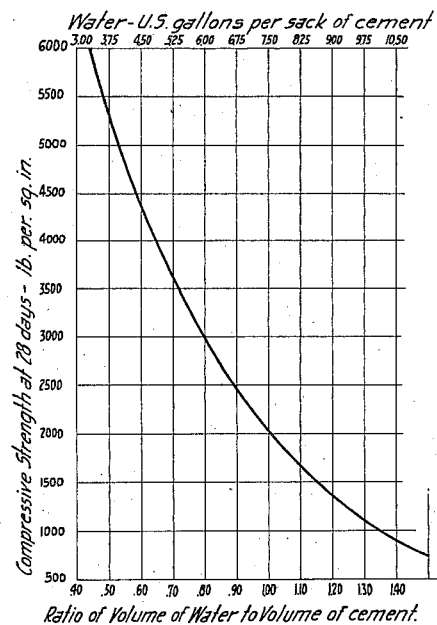
FIG_2_
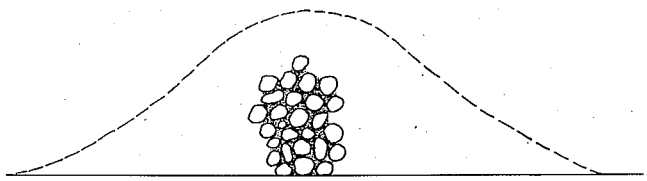
FIG_3_
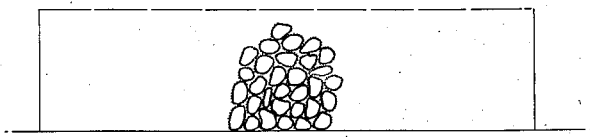
FIG_4_
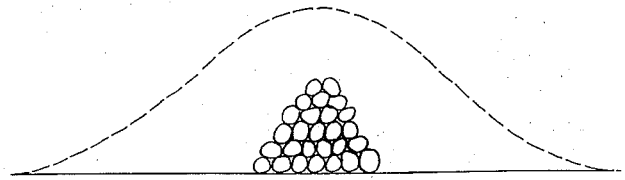
INVENTORS
Almer F. Moore
Martin A. Morrissey
BY
ATTORNEY.

Patented July 25, 1939

2,167,156

UNITED STATES PATENT OFFICE 2,167,156

METHOD OF PREPARING CONCRETE

Martin A. Morrissey and Almer F. Moore, Brighton, Mass., assignors of one-fourth to Oliver United Filters Incorporated, San Francisco, Calif., a corporation of Nevada Application February 26, 1935, Serial No. 8,232

1 Claim. (Cl. 259—149)

This invention is a continuation in part of the subject matter covered in our application Serial No. 572,438 filed October 31, 1931, and relates to a method of preparing concrete and in particular to a method for controlling the water content of aggregates used in making concrete.

Concrete is a mixture of cement, water, and inert material put in place in a plastic condition, but hardening soon after, due to the process known as the hydration of the cement. The fundamental requirements of practically all concrete are strength, durability and economy. From an economic standpoint the strength of a concrete structure should be substantially uniform throughout its entire mass, but as a practical matter this condition is seldom attained, and in order to make a concrete structure having a given minimum strength throughout its mass it has been found necessary to design and produce concrete whose average strength far exceeds the required minimum strength. The strength of concrete bears a definite relation to the quantity of water used in producing it.

One of the objects of the invention resides in placing concrete aggregate or any part thereof in a pre-determined controlled moisture condition prior to mixing it with the remaining ingredients of the mix.

Another object of the invention is the provision of a method whereby the consistency of a mass of concrete may be controlled throughout its entire mass.

Still another object of the invention is the provision of a method whereby the strength of a mass of concrete may be maintained at a pre-determined substantially uniform figure throughout its entire mass.

More specifically the object of the invention is the provision of a method whereby the individual particles of a concrete aggregate or the individual grains of its sand content are each coated with a film of water prior to mixing them with the remaining ingredients of the mix.

Referring to the drawing:

Figure 1 is a curve representing the water-cement ratio strength law.

Figure 2 represents a bed or pile of aggregate or sand saturated with water.

Figure 3 represents a bed of sand free of entrained water but each grain of which is surrounded with a film of water.

Figure 4 represents a body of bone dry sand.

In a concrete mix the cement and water are the only materials which enter into any chemical reaction. The cement water mixture may be considered as a glue whose function is to bind the aggregates together. The addition of water to the mix dilutes the glue and therefore decreases the strength of the resulting concrete. The final strength of the concrete therefore depends upon the quantity of water mixed or combining with the cement. This relation is generally shown in Fig. 1 which also illustrates the water-cement ratio strength law as enunciated by the Portland Cement Association. According to this law the strength of concrete, for given materials and conditions of manipulation, is determined solely by the ratio of the volume of mixing water to the volume of cement so long as the mixture is plastic and workable. From an inspection of Fig. 1 it will be noted that relatively small changes in the water content produce relatively large changes in the final strength of the concrete. Furthermore the strength of concrete in no way depends upon the quantities of aggregates used, so long as the mixture is plastic and workable and the aggregates are clean and made up of sound particles.

A body of aggregate or a body of sand used in making up the aggregate may be either in a bone dry condition as shown in Fig. 4, in an inundated or saturated condition as shown in Fig. 2 wherein the voids or interstitial spaces defined by the individual particles are filled with water, or in any intermediate condition. The quantity of water carried by such a body of aggregate or sand will vary anywhere from zero when in a bone dry condition to thirty or forty percent by volume when in an inundated or saturated condition and therefore to produce a concrete of a pre-determined and uniform strength it is necessary to determine the water content of the aggregate. If the aggregate used is bone dry there is no difficulty in preparing a concrete of pre-determined and uniform strength for the only water entering into the reaction is that deliberately added to the mix. As a practical matter, however, this condition is seldom encountered for the aggregate has to be washed clean before mixing and is therefore wet and furthermore is exposed to varying weather conditions. To dry the aggregate or even its sand content after washing would entail too much time and expense.

The moisture content of an inundated body of aggregate or sand is fairly definite and can be readily determined and although this method has been resorted to in some instances where aggregates have been batched by volume and in small quantities, under present methods of construction it has been found too slow for practical use.

The industry is therefore confronted with the need of some method of placing aggregates in a pre-determined, uniform and measurable moisture condition intermediate a bone dry and inundated condition.

We have found that there is one such condition which can be obtained and that this condition depends upon the following facts:

An individual particle of an aggregate such as a piece of crushed rock, a pebble or a grain of sand is capable of absorbing and adsorbing water. The amount of water so taken up depends upon the surface area of the particle, and the character of its surface, but for a particle of given size and mineralogical structure the amount is always constant. A particle in this condition (see Fig. 3) when placed among other particles in the same condition has no tendency to give up any portion of its water content to the other particles or to take up more water from them, and therefore it may be said to be in a neutral or balanced condition.

Furthermore the total surface area of the particles contained in a given volume increases as the size of the particles decreases, and therefore it will be observed that the water content of a given volume of aggregate, each particle of which is in a neutral condition, depends upon the grading of the aggregate. However, for a given grade and character of particle the moisture content will be substantially fixed. In this condition each particle is enveloped in a film of water which serves as a lubricant and therefore although the actual moisture content of batches of different grades may not be the same their consistency and therefore workability are always constant.

We have further found that a body of aggregate or sand can be placed in this so-called neutral condition by first wetting it beyond the neutral point and then freeing it of all excess entrained water by subjecting it to a differential extractive force such as is obtained by vacuum filtration or centrifuging. A continuous vacuum filter of the type shown in the Oliver Patent #1,335,695 of March 30, 1920, serves very nicely for this purpose and includes the filter unit proper, a vacuum receiver and a vacuum pump. The filter unit is made up of a horizontal planetary filter bed which revolves about a vertical axis. The aggregate or sand is continuously delivered to the filter bed in such a manner as to form a bed of uniform thickness and after being subjected to the differential pressure or extractive force of the filter is continuously discharged by means of a scraper or screw conveyor. There are three variables which enter into the operation of this equipment which have a bearing on its extractive action. These are, the cycle or length of time during which the material is under the influence of vacuum; the degree of vacuum used and the thickness of the bed of sand or aggregate. Other things being equal the thicker the bed of sand or aggregate the higher must be the vacuum or the longer the period of its application. Likewise a decrease in the mesh or particle size requires an increase in the vacuum applied and/or its period of application. Obviously the operating conditions which will dewater a fine sand to the neutral point will also serve to dewater a coarser sand.

Furthermore we have found that the vacuum gauge on the vacuum line of the filter gives a fairly accurate indication of the end point of the dewatering process or what we have termed the neutral point. When first applied the vacuum rises to a maximum and is maintained at this point for two or three seconds after which it gradually drops and finally comes to rest at the end point. The aggregate or sand is then found to be in a neutral moisture condition. The end point may also be determined by watching the filtrate line and noting the time at which the filtrate ceases to flow. A continued application of the vacuum results in the evaporation of the moisture held by each particle but within the cycle that the filter is operated this loss of moisture is negligible and may be disregarded. As a result of actual tests we have found that sand of a typical concrete grading can be dewatered on equipment of this kind to a neutral point wherein the moisture content of the sand is reduced to 10.5% based on the total weight of the sample by forming a 3½" bed of sand and rotating the filter at a rate of seven R. P. M. under a five inch (mercury) vacuum. Treated under these conditions the moisture content of a given grade of aggregate or sand at the neutral point remains constant. If therefore a table is prepared showing the moisture content of various grades and character of aggregates and sand at the neutral point it becomes possible merely by subjecting all of the sand or aggregate to vacuum filtration as above described to calculate its actual water content and to thereby produce a concrete of a pre-determined and uniform strength and consistency in accordance with the water-cement ratio strength law.

A table of the moisture content of neutralized sands and aggregates may be readily prepared by passing a known quantity of water through a bone dry bed of each grade and character of sand or aggregate formed on a leaf filter, placing the wet bed of sand under vacuum until the end point has been reached and then calculating the amount of water retained by the sand or aggregate. It should be particularly noted that this method of calculating the moisture content of the sand or aggregate is identical with the method used in placing the sand or aggregate in a neutral condition. In other words theory and practice in this instance are one and the same.

As a practical matter the entire aggregate need not be dewatered in the above manner for the gravel can be neutralized by tumbling it over a screen or perforated plate. This is because the relatively larger particles do not have a tendency to trap excess water within the mass and because the neutral point of ordinary ¾ or 1 inch gravel is not over 2%.

In passing all of the sand over a vacuum filter it is not only neutralized but also may be washed free of all dirt.

From the above description it will be noted that we have provided a method by which a concrete aggregate or its sand content may be placed in a uniform and known moisture condition regardless of its character and grading and that as a consequence it is possible to produce a concrete of uniform and pre-determined strength and consistency in accordance with the water-cement ratio strength law. In doing this it is of course assumed that measured quantities of the neutralized sand or aggregate are added to measured quantities of cement and water so that a concrete of pre-determined and uniform strength is produced.

Although vacuum filtration is particularly adapted for dehydrating the sand and/or gravel, any differential pressure may be used regardless of whether it is above or below atmospheric so long as it is a controlled force. In a table filter of the class described the vacuum applied is supplementing the action of gravity but may be greater or less than the force of gravity as the situation demands.

We claim:

A method of making concrete in accordance with the water-cement ratio strength law comprising wetting the sand content of the aggregate substantially beyond the neutral point; subjecting the sand so wetted to the action of a vacuum filter until the water content of the sand has been brought back to the neutral point and then mixing a measured quantity of the sand so treated with measured quantities of the remaining ingredients of the mix.

MARTIN A. MORRISSEY.
ALMER F. MOORE.